Aug. 27, 1929.  C. A. OTTO  1,726,409
REVERSED ACTING INTERMEDIATE RELAY
Filed Nov. 8, 1928
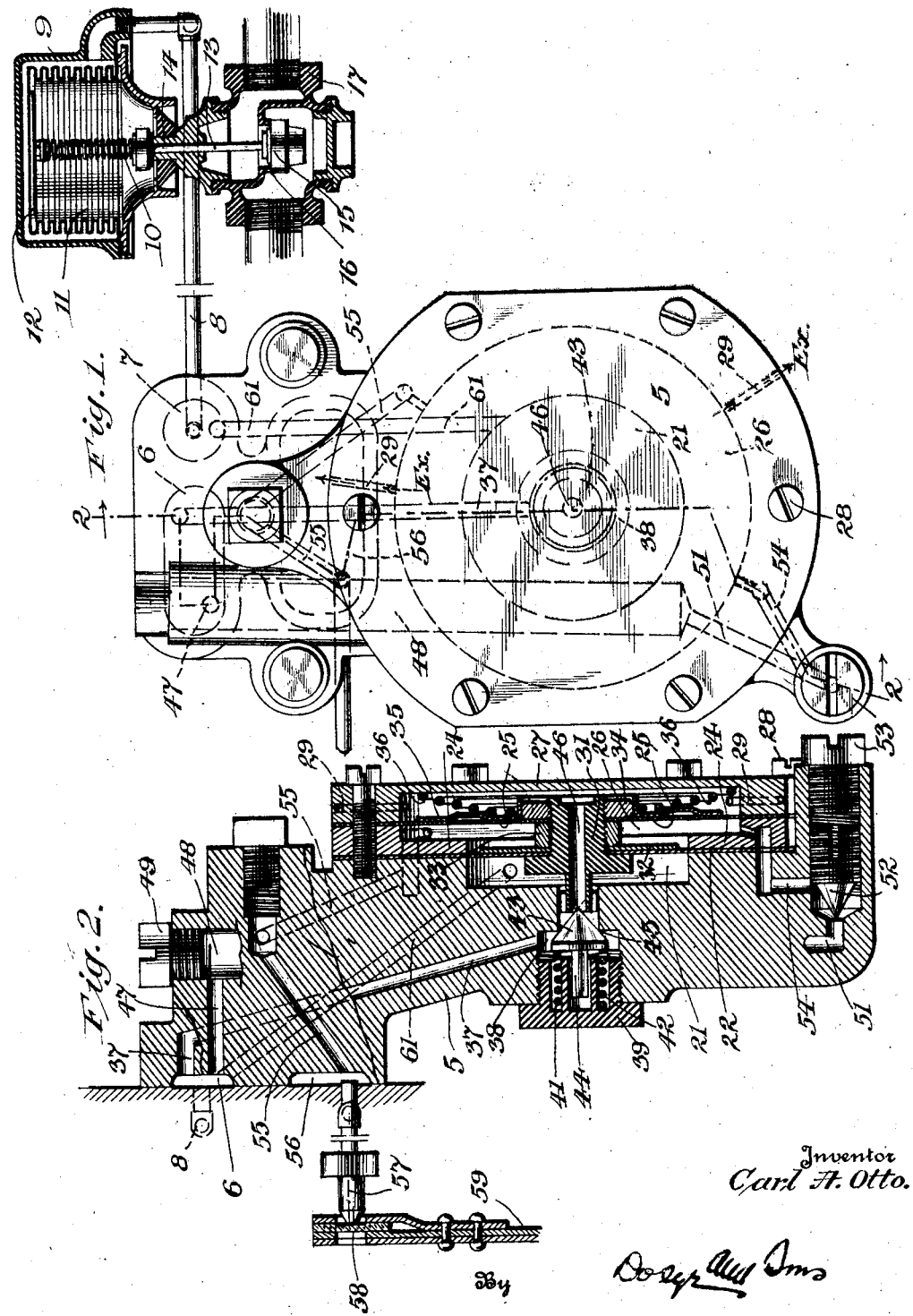
Inventor
Carl H. Otto.

Patented Aug. 27, 1929.

1,726,409

UNITED STATES PATENT OFFICE.

CARL A. OTTO, OF MILWAUKEE, WISCONSIN, ASSIGNOR TO JOHNSON SERVICE COMPANY, OF MILWAUKEE, WISCONSIN, A CORPORATION OF WISCONSIN.

REVERSED-ACTING INTERMEDIATE RELAY.

Application filed November 8, 1928. Serial No. 318,076.

The present invention relates to automatic control of atmospheric conditions such as temperature, humidity and the like, and relates to certain improvements in automatic control devices of the pressure operated relay type.

In Patent 1,500,260, granted to A. J. Otto and Carl A. Otto, on July 8, 1924, there is described a thermostat of the so-called intermediate type in which the pressure in a controlled chamber follows closely a pressure established in a controlling chamber as the result of the varying indications of a responsive element such as a bi-metallic thermostatic bar.

The present invention provides an instrument in which pressure in the controlled chamber varies inversely with reference to variations of pressure in the controlling chamber, the variations of pressure in the controlling chamber being produced, as before, by the action of a responsive element.

The instrument forming the subject matter of the present application is applicable generally, but it derives peculiar utility in those installations where it is desired to use two relays operating in reverse senses when controlled by a single responsive element. The structure herein claimed preserves, as far as is reasonably possible, the structural characteristics of the Otto and Otto device.

In the drawings,—

Fig. 1 is a front elevation of the device showing this connected to a radiator valve which is illustrated merely as a typical mechanism controllable by the thermostat.

Fig. 2 is a section on the line 2—2 of Fig. 1.

The body of the device is illustrated at 5 and is intended to be mounted on the usual pipe head, not shown, by which the usual connections to the supply and control pipe are made. Pressure fluid is supplied from the pipe head to a recess 6. A second recess 7, shown in dotted lines in Fig. 1, is connected by a pipe 8 with a shell 9 of the radiator valve motor. This motor consists of a metallic bellows 11 upon the top of which the fluid pressure acts. Mounted in the top of the bellows 11 is a pressure plate 12 connected to the valve stem 13 which is surrounded by thrust spring 10. The valve stem passes through gland 14 and is connected at its end to the radiator valve 15. This coacts with a seat 16 in the valve body 17.

It will be observed that when pipe 8 is vented the spring 10 closes the valve 15. Pressure fluid supplied to the casing 9 through the pipe 8 will act upon the bellows 11, overpower the spring 10 and open the valve 15. As stated, the radiator valve mechanism is merely typical of the device to be operated.

Formed in the front face of the body 5 is a recess or chamber 21, which is the controlled chamber. The forward side of this chamber is covered by a flexible diaphragm 22. This diaphragm is held in place by a clamping ring 24 which in turn supports a second flexible diaphragm 25. The ring 24 is shouldered or counterbored, as shown, so that the effective area of the diaphragm 25 is greater than the effective area of the diaphragm 22. The space 26 between the two diaphragms is the controlling chamber. The diaphragm 25 is held in place by a flanged cover plate 27 which together with the ring 24 is held in place by the machine screws 28.

The space between the diaphragm 25 and cover 27 is vented to atmosphere at 29 so that in effect the diaphragm 25 is subject to atmospheric pressure at all times on its outer or forward face. A tubular member 31 extends through alined central apertures in the diaphragms 22 and 25. A reinforcing plate 32 and nut 33 clamp the member 31 to the diaphragm 22 and a nut 34 clamps it to the front diaphragm 25.

A thrust plate 35 encircles the nut 34 and acts as a seat for the coil spring 36 which reacts between the cover 27 and the thrust plate 35 to urge both diaphragms and their central connecting piece 31 inward, or to the left relatively to Fig. 2. The recess 6 communicates by means of a passage 37 with a chamber 38 into which is threaded from the back of the body 5, a plug 39. Plug 39 is formed with an annular spring seat 41 which receives a spring 42 and this spring reacts in a closing direction against a conical valve 43. The valve 43 is guided in the plug 39 by means of a pilot or stem 44. The valve 43 seats at 45 in a passage leading from the chamber 38 to the controlled chamber 21. It is axially alined with the bore 46 of the tubular member 31 and thus leads from the chamber 21 to the space between diaphragm 25 and the cover 27, which, as explained, is always open to atmosphere.

When the member 31 moves to the left it engages the valve 43 so that this valve closes the passage 46. Continued motion of the member 31 to the left has the effect of lifting the valve 43 from the seat 45 to admit pressure through the passage 37 to the controlled chamber 21.

There is a second supply port 47 leading from the recess 6 to a filter chamber 48, to which access may be had by removing the plug screw 49.

The chamber 48 is connected at its lower end by a passage 51 to the seat of an adjustable needle valve 52. The valve 52 is threaded and is sealed against leakage by a plug screw 53 which overlies it.

From the port 51 air flows past the throttling needle valve 52 to a passage 54 which leads to the controlling chamber 26. From the controlling chamber 26 there leads a passage 55 which extends to a recess 56 in the body 5. The recess 56 is connected through the pipe head to a leak port 57 which is controlled by the valve member 58 on the end of the bi-metallic thermostatic bar 59. This bar is supported at its lower end in any known manner, for example, in the manner shown in Patent 1,500,260, and is merely representative of any responsive element such as a thermostat, hygrostat and the like.

The needle valve 52 is so adjusted that the flow past the needle valve is decidedly less than the capacity of the leak port 57. It follows that the gradual opening and closing of the leak port 57 produces gradual changes of pressure in the controlling chamber 26.

The controlled chamber 21 is connected by the passage 61 with the recess 7 and consequently with the pipe 8. The strength of the spring 36 is properly chosen with reference to the pressures to be used and the areas of the diaphragms 22 and 25.

In operation air under pressure will be supplied by the pipe head to the recess 6. Air flowing by way of passage 51 to the controlling chamber will establish in that chamber a pressure which varies with the variable opening of the leak port 57. This variable opening is controlled by the thermostatically actuated valve 58. As the pressure in the controlling chamber 26 rises the two diaphragms act in opposition to each other and the larger diaphragm prevails so that the diaphragms move forward or to the right as seen in Fig. 2. The effect of this is to cause valve 43 to seat at 45, cutting off the supply and at the same time to open the exhaust port 46. Thus the pressure in the controlled chamber drops as the pressure in the controlling chamber rises. Conversely a reduction of pressure in the controlling chamber 26 causes the diaphragms to move to the left, urged by the spring 36, closing the exhaust through 46 and unseating the supply valve 43 at 45. Thus a reduction of pressure in the controlling chamber 26 produces an increase of pressure in the controlled chamber 21.

The motion of the diaphragms 22 and 25 is gradual and the changes of pressure which occur in the chamber 21 as the result of changes of pressure in the chamber 26 exert a corrective or limiting action on the motion of the diaphragm 22. Consequently the controlled pressure varies progressively with the changes of pressure in the controlling chamber but in the reverse sense.

This reverse acting progressive relay is of general applicability but is of particular utility in cases where the relay structure of the present application and the relay structure of Patent 1,500,260, are conjointly controlled by a single thermostatic bar. Obviously, a single such bar and leak port could be connected to the controlling chamber 18 of the issued patent and to the controlling chamber 26 of the present application, and control the two simultaneously. In such cases the relays would operate in reverse senses. It often happens that two such diverse mechanisms produce a simple installation adaptable to many circumstances encountered in the automatic control art as will readily be appreciated.

While the device has been described with some particularity it may be embodied in somewhat different forms within the scope of the invention.

What is claimed is,—

1. A control device comprising in combination two spaced diaphragms of different areas; a casing, forming with the diaphragms a controlling chamber between the diaphragms in which pressure acts oppositely in the two diaphragms, and a controlled chamber in which pressure acts against the smaller diaphragm, said controlled chamber being arranged for connection to a device to be controlled; a member connecting said diaphragms to move in unison; a valve controlling the supply of pressure fluid to the controlled chamber and the exhaust of fluid therefrom and arranged to open supply and exhaust alternately with an intermediate position in which both are closed; connections for actuating said valve by the motion of said diaphragms; yielding means urging said diaphragms in a direction to open the supply; and means responsive to atmospheric conditions for varying the pressure in said controlling chamber.

2. A control device comprising in combination a body having an open sided chamber; a pressure fluid supply passage leading to said chamber, and a passage for connecting said chamber with a device to be controlled; a diaphragm closing the open side of said chamber; a second and larger diaphragm enclosing between it and the first diaphragm a second chamber, the second diaphragm being subject on its outer side to atmospheric pressure; a member connecting said diaphragms and having an exhaust passage leading from the first chamber to atmosphere; a valve controlling said supply passage, yieldingly urged in a closing direction, arranged to be engaged by said connecting member as the diaphragms move inward, and when so engaged to close the exhaust passage and upon further movement to open said supply passage; valve means responsive to atmospheric conditions to vary the pressure in said second chamber; and yielding means urging said diaphragms inward.

In testimony whereof I have signed my name to this specification.

CARL A. OTTO.